US011198616B2

(12) United States Patent
Larcher et al.

(10) Patent No.: US 11,198,616 B2
(45) Date of Patent: Dec. 14, 2021

(54) ZIRCONIUM AND YTTRIUM-BASED COMPOSITION, METHOD FOR PREPARING SAME AND USE THEREOF IN A CATALYST SYSTEM

(75) Inventors: Olivier Larcher, Perigny (FR); Emmanuel Rohart, Sainte Soulle (FR)

(73) Assignee: RHODIA CHIMIE, Aubervilliers (FR)

( * ) Notice: Subject to any disclaimer, the term of this patent is extended or adjusted under 35 U.S.C. 154(b) by 0 days.

(21) Appl. No.: 11/547,157

(22) PCT Filed: Apr. 5, 2005

(86) PCT No.: PCT/FR2005/000828
§ 371 (c)(1),
(2), (4) Date: Oct. 5, 2007

(87) PCT Pub. No.: WO2005/100248
PCT Pub. Date: Oct. 27, 2005

(65) Prior Publication Data
US 2008/0187476 A1    Aug. 7, 2008

(30) Foreign Application Priority Data
Apr. 7, 2004  (FR) ...................................... 0403654

(51) Int. Cl.
*B01J 23/10*  (2006.01)
*C01G 25/00*  (2006.01)
*C01G 25/02*  (2006.01)

(52) U.S. Cl.
CPC .............. *C01G 25/00* (2013.01); *B01J 23/10* (2013.01); *C01G 25/006* (2013.01); *C01G 25/02* (2013.01); *C01P 2006/12* (2013.01); *C01P 2006/13* (2013.01); *C01P 2006/16* (2013.01)

(58) Field of Classification Search
CPC ... B01J 21/06; B01J 23/42; B01J 23/58; B01J 23/10; C01G 25/02; C01G 25/006
USPC ........... 75/235; 110/345; 502/104, 302, 349, 502/355; 423/213.2
See application file for complete search history.

(56) References Cited

U.S. PATENT DOCUMENTS

| | | | |
|---|---|---|---|
| 4,764,491 A * | 8/1988 | Quadir | 501/103 |
| 5,015,617 A | 5/1991 | Ohata et al. | |
| 5,908,800 A | 6/1999 | Bonneau et al. | |
| 6,080,699 A * | 6/2000 | Pohl | 502/303 |
| 6,133,194 A | 10/2000 | Cuif et al. | |
| 6,214,306 B1 | 4/2001 | Aubert et al. | |
| 6,228,799 B1 | 5/2001 | Aubert et al. | |
| 6,403,695 B1 * | 6/2002 | Soeda | C08K 3/04 423/449.1 |
| 6,420,063 B1 * | 7/2002 | Ozin et al. | 429/488 |
| 6,797,668 B2 * | 9/2004 | Yoshikawa | 502/304 |
| 7,101,523 B2 * | 9/2006 | Mori | C01B 33/152 423/335 |
| 7,314,846 B2 * | 1/2008 | Kuno | 502/326 |
| 7,608,559 B2 * | 10/2009 | Takeshima et al. | 502/304 |
| 7,964,527 B2 * | 6/2011 | Larcher | B01D 53/945 423/213.2 |
| 8,956,994 B2 * | 2/2015 | Ifrah | B01D 53/9413 502/100 |
| 2003/0124035 A1 * | 7/2003 | Bert et al. | 422/171 |
| 2003/0224931 A1 | 12/2003 | Yamamoto et al. | |
| 2006/0263284 A1 | 11/2006 | Larcher et al. | |

FOREIGN PATENT DOCUMENTS

| | | |
|---|---|---|
| EP | 0337809 A2 | 10/1989 |
| EP | 0955267 A1 | 11/1999 |
| EP | 1 479 651 A1 | 11/2004 |
| JP | 11-169728 | 6/1999 |
| JP | 2005-224705 | 8/2005 |
| WO | 97/02213 A1 | 1/1997 |
| WO | WO 97/02213 A1 | 1/1997 |
| WO | WO 97/43214 A1 | 11/1997 |
| WO | WO 98/45212 A1 | 10/1998 |
| WO | 98/51617 A1 | 11/1998 |
| WO | 2004/002893 A2 | 1/2004 |
| WO | WO 2004/085314 A2 | 10/2004 |

OTHER PUBLICATIONS

Laberty-Robert et al., "Dense yttria stabilized zirconia: sintering and microstructure." Nov. 20, 2002 Elsevier Science Ltd and Techna.*
International Search Report Application No. PCT/FR2005/000828 dated Sep. 13, 2005.
N. M. Ghoneim et al., "Characteristics and effect of thermal treatment on surface texture of ultrafine zirocnia powders", Journal of Material Science, 1987, vol. 22, pp. 791-797 (7 pages).
M. Hirano et al., "Preparation, Sintering, Microstrucuture, and Thermal Stability of Y2O3- and CeO2-Doped Tetragonal Zirconia Ceramics" Ceramics International, 1991, vol. 17, pp. 359-365 (7 pages).

* cited by examiner

*Primary Examiner* — Stuart L Hendrickson
(74) *Attorney, Agent, or Firm* — Osha Bergman Watanabe & Burton LLP

(57) ABSTRACT

Zirconium and yttrium oxide-based composition with a specific surface area of at least 12 m 2/g following calcination at 1000° C. for 10 hours. This composition is obtained via a method wherein a mixture of zirconium and yttrium compounds is precipitated with a base; the resulting precipitate-containing medium is heated; a compound selected from anionic surfactants, non-ionic surfactants, polyethylene glycols, carboxylic acids and the salts thereof and carboxymethylated fatty alcohol ethoxylate-type surfactants is then added to said precipitate, and, finally, the precipitate is calcined. Said composition can be used as a catalyst.

21 Claims, 1 Drawing Sheet

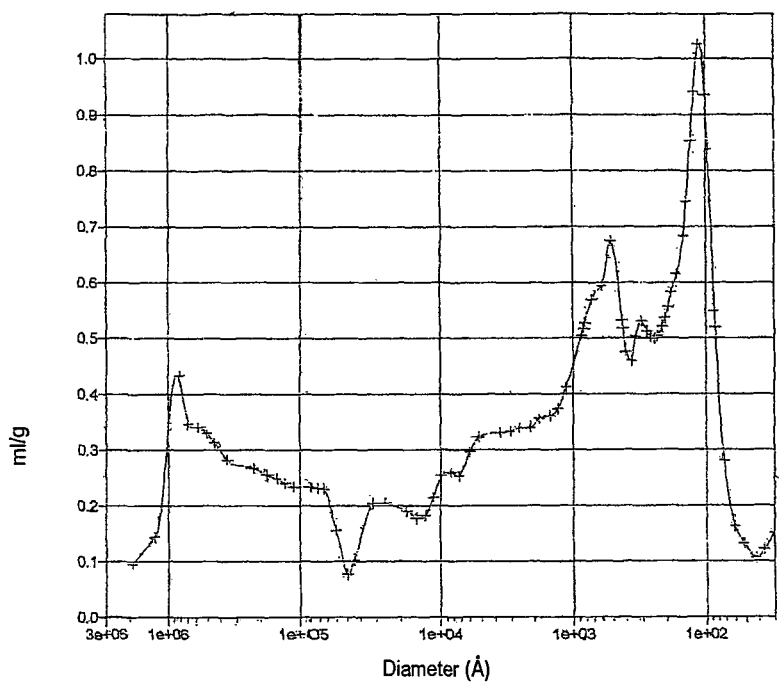

ZIRCONIUM AND YTTRIUM-BASED COMPOSITION, METHOD FOR PREPARING SAME AND USE THEREOF IN A CATALYST SYSTEM

This application is an application under 35 U.S.C. Section 371 of International Application Number PCT/FR2005/000828 filed on Apr. 5, 2005.

The present invention relates to a zirconium- and yttrium-based composition, to a method for preparing it and to its use in a catalyst system.

Catalysts called multifunctional catalysts are used at the present time for the treatment of exhaust gases of internal combustion engines (motor vehicle post-combustion catalysis). Multifunctional catalysts are understood to mean catalysts capable not only of performing the oxidation of carbon monoxide and hydrocarbons present in exhaust gases but also of reducing nitrogen oxides also present in these gases ("three-way" catalysts). Catalysts based on zirconium oxide or cerium oxide are at the present time known to be particularly valuable for these types of reaction.

To be effective, these catalysts must have a high specific surface area and a search is always being made for catalysts that are capable of being used at increasingly high temperatures and, for this, have improved stability of their specific surface area.

The object of the invention is therefore to develop a catalytic composition that can respond to this characteristic.

With this objective, the composition of the invention is zirconium oxide-based and is characterized in that it includes yttrium oxide as an additive and in that it has a specific surface area of at least 12 $m^2/g$ after calcination at 1000° C. for 10 hours.

Other features, details and advantages will become more completely apparent on reading the following description, as well as various concrete, but not limiting, examples intended to illustrate it, and from the appended drawing in which:

FIG. 1 is a porogram of a composition of the invention.

For the remainder of the description, specific surface area is understood to mean the BET specific surface area determined by nitrogen adsorption according to ASTM standard D 3663-78 established from the Brunauer-Emmett-Teller method described in the periodical "The Journal of the American Chemical Society, 60, 309 (1938)".

The Periodic Table of the Elements to which reference is made in the present description is that published in the Supplément au Bulletin de la Société Chimique de France No. 1 (January 1966).

A rare earth is understood to mean an element of the group consisting of yttrium and elements of the Periodic Table with an atomic number between 57 and 71 inclusive.

In addition, the calcinations following which surface area values are given are calcinations in air unless indicated to the contrary.

Concentrations are given as oxides unless indicated to the contrary.

The main features of the compositions of the invention are the nature of their constituents and their specific surface area.

The compositions of the invention are based on zirconium $ZrO_2$, this oxide being the essential or major constituent. The compositions additionally include at least one additive which is yttrium oxide and which constitutes or can constitute the remainder of the composition.

According to a variant, the compositions of the invention can additionally include one other additive in the form of an oxide, this additive being chosen from praseodymium, lanthanum and neodymium, this other additive constituting or being able to constitute the remainder of the composition. It will be noted here that the invention of course covers the case of compositions including several oxides of these elements in combination.

The additive concentration is at most 50% by weight. This concentration is expressed as the weight of oxide of the additive or of all the additives in the case of compositions with several additives, based on the weight of the composition in its entirety (zirconium oxide and additive oxide(s)). This additive concentration can vary within a wide range and can more notably lie between 5% and 40% and more particularly between 10% and 40%. This concentration may quite particularly lie between 10% and 30%.

According to a variant, the compositions of the invention can additionally include aluminum oxide $Al_2O_3$. In this case, the aluminum concentration (weight % of $Al_2O_3$ based on the total composition) is generally at most 20% and preferably lies between 1% and 10%.

According to another variant, the compositions of the invention can additionally include silica in proportions identical to those given above for alumina.

The other main feature of compositions of the invention is their high specific surface area at a high temperature.

As indicated above, this surface area is at least 12 $m^2/g$, after calcination at 1000° C. for 10 hours. Under the same calcination conditions, this surface area can be at least 14 $m^2/g$. In the case of the variant mentioned above, that is to say with another additive chosen from praseodymium, lanthanum and neodymium, this surface area can be at least 25 $m^2/g$ and more particularly at least 30 $m^2/g$ and even more particularly at least 40 $m^2/g$, still under the same calcination conditions. It may be noted that in the case where the additive is yttrium, surface areas of at least 20 $m^2/g$ can be reached and in the case where the additive is yttrium in combination with praseodymium, lanthanum or neodymium surface values of the order of at least 55 $m^2/g$ can be reached.

At temperatures lower than those mentioned above, for example after calcination of 900° C. for 4 hours, the compositions can have a specific surface area of at least 25 $m^2/g$, more particularly at least 30 $m^2/g$.

The compositions of the invention may, in some cases, be in the form of solid solutions of the additive in zirconium oxide.

In this case, the X-ray diffraction diagrams of these compositions reveal the existence of a single phase corresponding to that of a zirconium oxide crystallized in the tetragonal or cubic system, thus revealing the incorporation of the additive into the crystal lattice of zirconium oxide and hence the formation of a true solid solution. The compositions can also be in the form of a mixture of phases, particularly in the case of high additive concentrations, namely at least 40%, or furthermore in the case of low additive concentrations, namely below 10% and, in this latter case, after calcination at a temperature of 900° C. or higher.

The compositions of the invention moreover possess a specific porosity. In point of fact, they contain mesopores, namely pores of which the size lies between 5 nm and 500 nm and more particularly between 10 nm and 200 nm, even after high temperature calcination. These size values are obtained by mercury porosimetry (analysis made with Micromeritic's Autopore 9410 porosimeter comprising two low pressure stations and a high pressure station). These mesopores may contribute a large part of the total pore volume, for example those of which the size lies between 5 nm and 500 nm can provide at least 40%, more particularly at least 60%, of this total pore volume. It may also be noted that the compositions of the invention can comprise two mesopore populations, the size of which is centered around approximately 10 nm (10-12 nm) and approximately 60 nm respectively, these populations being evidenced in the porograms by the presence of two peaks centered on these two values. Finally, the porogram curve of the compositions of the invention giving the cumulative pore volume as a function of the diameter of pores exhibits a substantially linear profile which shows a substantially homogeneous contribution to the total pore volume of all the pores with a diameter of between 5 nm and 1 nm.

The compositions of the invention may have a very low sulfate anion content. This content is generally at most 100 ppm and preferably at most 50 ppm (weight ratio of $SO_4^-$/all the composition).

The method for preparing the composition according to the invention will now be described.

This method comprises the following steps:
(a) a mixture comprising compounds of zirconium, of the additive and, optionally, aluminum or silicon is formed;
(b) said mixture is brought into the presence of a basic compound through which a precipitate is obtained;
(c) said precipitate is heated in a liquid medium;
(d) there is added to the precipitate obtained in the preceding step, a compound chosen from anionic surfactants, nonionic surfactants, polyethylene glycols, carboxylic acids and their salts and surfactants of the carboxymethylated fatty alcohol ethoxylate type;
(e) the precipitate obtained in this way is calcined.

The first step of the method therefore consists in preparing a mixture in a liquid medium of a zirconium compound, an yttrium compound and optionally a compound of another additive or of aluminum or of silicon.

The mixture is generally prepared in a liquid medium that is preferably water.

The compounds are preferably soluble compounds. These may be in particular salts of zirconium, of yttrium, of another additive and of aluminum. These compounds may be chosen for example from nitrates, acetates or chlorides.

As examples, mention may thus be made of zirconyl nitrate or zirconyl chloride. Zirconyl nitrate is more generally used.

It is also possible to use a sol as the starting zirconium compound. A sol denotes any system consisting of fine solid particles of colloidal dimensions, namely dimensions comprised between approximately 1 nm and 500 nm, based on a zirconium compound, this compound generally being a zirconium oxide or hydrated zirconium oxide, in suspension in an aqueous liquid phase, it being possible for said particles additionally to contain, as the case may be, bonded or adsorbed residual quantities of ions such as for example nitrates, acetates, chlorides or ammonium ions. It will be noted that in such a sol, zirconium may exist either entirely in the form of colloids, or simultaneously in the form of ions and in the form of colloids.

The starting mixture may be obtained equally either from compounds initially in the solid state that are subsequently introduced into water in the bottom of the vessel for example, or directly from solutions of these compounds, said solutions being then mixed in any order.

In the second step (b) of the method, said mixture is put into the presence of a basic compound. Products of the hydroxide type can be used as a base or basic compound. Mention may be made of the hydroxides of alkali metals or alkaline earths. It is also possible to use secondary, tertiary or quaternary amines. However, amines and ammonia may be preferred in as much as they reduce risks of contamination by alkali metal or alkaline earth cations. Urea may also be mentioned.

The basic compound is generally used in the form of an aqueous solution.

The manner in which the mixture is brought into contact with the solution, namely the order in which these are introduced, is not critical. However contact can be achieved by introducing the mixture into the solution of the basic compound.

The contact or reaction between the mixture and solution, in particular addition of the mixture to the solution of the basic compound, can be carried out in one operation, gradually or continuously, and it is preferably carried out with stirring. It is preferably carried out at ambient temperature (20-25° C.).

The following step (c) of the method is the step of heating the precipitate in a liquid medium.

This heating may be carried out directly on the reaction medium obtained after reaction with the basic compound or on a suspension obtained after separating the precipitate from the reaction medium, possibly washing the precipitate and resuspending it in water. The temperature at which the medium is heated is at least 100° C., more particularly at least 130° C. and even more particularly at least 150 m²/g. The heating operation may be carried out by introducing the liquid medium into a closed chamber (closed reactor of the autoclave type). Under the temperature conditions given above, and in a liquid medium, it may be stated, by way of illustration, that the pressure in the closed reactor can vary between an upper value of 1 bar ($10^5$ Pa) and 165 bar ($1.65 \times 10^7$ Pa) preferably between 5 bar ($5 \times 10^5$ Pa) and 165 bar ($1.65 \times 10^7$ Pa). Heating may also be carried out in an open reactor for temperatures close to 100° C.

Heating may be carried out either in air, or in an atmosphere of inert gas, preferably nitrogen in the latter case.

The duration of heating can vary within wide limits, for example between 1 and 48 hours, preferably between 2 and 24 hours. Similarly, the temperature rise is carried out at a rate that is not critical, and it is therefore possible to reach the fixed reaction temperature by heating the medium for example for between 30 minutes and 4 hours, these values being given in an entirely indicative manner.

It is possible to carry out several heatings. Thus, the precipitate obtained after the step of heating and possibly washing it can be resuspended in water, and the medium obtained in this way can then be heated again. This other heating is carried out under the same conditions as those which have been described for the first.

The following step (d) of the method consists in adding, to the precipitate resulting from the preceding step, a compound that is chosen from anionic surfactants, nonionic surfactants, polyethylene glycols and carboxylic acids and their salts.

As regards this compound, reference may be made to the teaching of application WO-98/45212 and the surfactants described in this document may be used.

As surfactants of the anionic type, mention may be made of ethoxycarboxylates, ethoxylated fatty acids, sarcosinates, phosphate esters, sulfates such as alcohol sulfates, alcohol ether sulfates and sulfated alkanolamide ethoxylates, sulfonates such as sulfosuccinates, alkylbenzenes or alkylnaphthalenesulfonates.

As a nonionic surfactant, mention may be made of acetylenic surfactants, alcohol ethoxylates, alkanolamides, amine oxides, ethoxylated alkanolamides, long-chain ethoxylated amines, ethylene oxide/propylene oxide copolymers, sorbitan derivatives, ethylene glycol, propylene glycol, glycerol, polyglyceryl esters and their ethoxylated derivatives, alkylamines, alkylimidazolines, ethoxylated oils and alkylphenol ethoxylates. Mention may be made in particular of products sold under the trade names Igepal®, Dowanol®, Rhodamox® and Alkamide®.

As regards carboxylic acids, use may be made in particular of aliphatic mono- or dicarboxylic acids and among these more particularly saturated acids. Use may also be made of fatty acids and more particularly saturated fatty acids. Mention may thus be made in particular of formic, acetic, propionic, butyric, isobutyric, valeric, caproic, caprylic, capric, lauric, myristic and palmitic acids. As dicarboxylic acids, mention may be made of oxalic, malonic, succinic, glutaric, adipic, pimelic, suberic, azeleic and sebacic acids.

Salts of carboxylic acids can also be used. particularly ammonium salts.

As an example, mention may more particularly be made of lauric acid and ammonium laurate.

Finally, it is possible to use a surfactant that is chosen from those of the carboxymethylated fatty alcohol ethoxylate type.

Carboxymethylated fatty alcohol ethoxylate type products are understood to mean products consisting of ethoxylated or propoxylated fatty alcohols having a —CH$_2$—COOH group at the end of the chain.

These products may correspond to the formula:

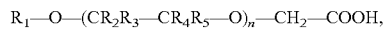

$$R_1\text{—}O\text{—}(CR_2R_3\text{—}CR_4R_5\text{—}O)_n\text{—}CH_2\text{—}COOH,$$

in which $R_1$ denotes a saturated or unsaturated carbon chain, the length of which is generally at most 22 carbon atoms, preferably at least 12 carbon atoms; $R_2$, $R_3$, $R_4$ and $R_5$ may be identical and represent hydrogen or again $R_2$ can represent a $CH_3$ group and $R_3$, $R_4$ and $R_5$ represent hydrogen; n is an integer that is not zero and can extend to 50 and more particularly can lie between 5 and 15, these values being inclusive. It will be noted that a surfactant can consist of a mixture of products of the above formula for which $R_1$ can be saturated and unsaturated respectively or furthermore products having at the same time —CH$_2$—CH$_2$—O— and —C(CH$_3$)—CH$_2$—O— groups.

The surfactant can be added in two ways. It can be added directly to the precipitate suspension coming from the preceding heating step (c). It can also be added to the solid precipitate after this is separated by any known means from the medium in which heating has been carried out.

The quantity of surfactant used, expressed as a percentage by weight of surfactant based on the weight of the composition calculated as oxide, generally lies between 5% and 100%, more particularly between 15% and 60% and even more particularly between 35% and 50%.

According to a variant of the method of the invention, it is possible, following step (d) that has just been described, to mill the precipitate.

This milling can be carried out in various ways.

A first way consists in high energy milling of the wet type. Such milling is carried out on a wet precipitate that has been obtained for example after adding the surfactant to the solid precipitate. Wet milling can be carried out in a ball mill for example.

A second way consists of medium energy milling by subjecting a suspension of the precipitate to shear, for example using a colloid mill or a turbine agitator. This suspension can be an aqueous suspension which has been obtained after dispersing the precipitate obtained following steps (d) in water.

In a second step of the method according to the invention, the recovered precipitate is then calcined. The precipitate can optionally be washed with water before calcination. This calcination makes it possible to develop the crystallinity of the product formed and it can also be adjusted and/or chosen according to the subsequent utilization temperature reserved for the composition according to the invention, and to do so taking into account the fact that the specific surface area of the product is lower the higher the calcination temperature employed. Such calcination is generally performed in air, but calcination carried out for example in an inert gas or in a controlled (oxidizing or reducing) atmosphere is obviously not excluded.

In practice, the calcination temperature is generally limited to an interval of values between 500° C. and 1100° C. and more particularly between 600° C. and 900° C.

The compositions of the invention as described above or as obtained in the method previously studied are in the form of powders but they may be optionally formed so as to be in the form of granules, beads, cylinders or honeycombs of variable dimensions.

The compositions of the invention can be used as catalysts or catalyst supports. Thus, the invention also relates to catalyst systems comprising compositions of the invention. For such systems, these compositions can be applied to any support normally used in the field of catalysis, namely in particular thermally inert supports. This support can be chosen from alumina, titanium oxide, cerium oxide, silica, spinels, zeolites, silicates, crystalline silicoaluminum phosphates and crystalline aluminum phosphates.

The compositions can also be used in catalyst systems comprising a coating (wash coat) with catalytic properties and based on these compositions, on a substrate of the metallic or ceramic monolithic type for example. The coating can also have a support of the type of those mentioned above. This coating is obtained by mixing the composition with the support so as to form a suspension that can then be deposited on the substrate.

In the case of these uses in catalysis, the compositions of the invention are employed in combination with transition metals; they act in this way as a support for these metals. Transition metals are understood to be elements of groups IIIA to IIIB of the Periodic Table. As transition metals, mention may more particularly be made of iron, manganese and copper as well as precious metals such as platinum, rhodium, palladium, silver or iridium. The nature of these metals and techniques for incorporating these in support compositions are well known to a person skilled in the art. For example, the metals can be incorporated into compositions by impregnation.

Concentrations of the aforementioned metal in the compositions correspond to concentrations generally used in catalysts in order to obtain catalytic activity. As an example, this concentration is at most 5%, in particular at most 1%. It can in particular be at most 0.5%, and even at most 0.25%. Concentrations greater than 5% are not generally of value from an economic point of view. These concentrations are expressed as a weight percentage of the metal based on the composition.

The catalyst systems and more particularly the compositions of the invention can be found in very many applications. They are thus particularly well suited to, and hence can be used in, the catalysis of various reactions such as, for example, dehydration, dehydrosulfuration, hydrodenitrification, desulfuration, hydrodesulfuration, dehydrohalogenation, reforming, steam reforming, cracking, hydrocracking, hydrogenation, dehydrogenation, isomerization, disproportionation, oxychlorination, dehydrocyclization of hydrocarbons or other organic compounds, oxidation and/or reduction reactions, the Claus reaction, treatment of exhaust gases of internal combustion engines, demetallation, methanation, shift conversion, catalytic oxidation of soot emitted from internal combustion engines such as lean burn diesel or gasoline engines.

The catalyst systems and more particularly the compositions of the invention are particularly well suited for the treatment of exhaust gases of internal combustion engines such as lean burn diesel or gasoline engines. This treatment can more precisely be a treatment for eliminating NOx by continuous reaction with hydrocarbons in a lean mixture (HC-DeNOx catalysis).

On account of this, the invention also relates to a method for treating exhaust gases from internal combustion engines, which is characterized in that use is made, as a catalyst, of a catalyst system as described above or a composition according to the invention as previously described.

It will finally be noted that, in a method of this type, the compositions of the invention can be used in association with compositions based on cerium oxide stabilized by additives such as zirconium oxide or such as a rare earth oxide, it being possible to use zirconium oxide and the rare earth oxide in combination in this case, or furthermore in association with compositions based on zirconium oxide, it being possible for this oxide to be itself doped with or stabilized by a rare earth, such as in particular cerium. These associations lead to systems enabling all pollutants emitted from an engine to be converted at low temperatures and above.

Examples will now be given.

EXAMPLE 1

This example relates to the preparation of a composition of 90% zirconium and 10% yttrium, these proportions being expressed in weight percentages of the oxides $ZrO_2$ and $Y_2O_3$.

750 ml of zirconium nitrate (120 g/l) and 25 ml of yttrium nitrate (400 g/l) were introduced into a beaker fitted with a stirrer. This was then made up with distilled water so as to obtain 1 liter of a solution of these two nitrates.

202 ml of an ammonia solution (12 mol/l) were introduced into a round-bottomed reactor fitted with a stirrer and were then made up with distilled water so as to obtain a total volume of 1 liter.

The solution of nitrates was introduced over 1 hour into the reactor with continuous stirring.

The solution obtained was placed in a stainless steel autoclave fitted with a stirrer. The temperature of the medium was brought to 150° C. over 2 hours with stirring.

The suspension obtained in this way was then filtered through a Büchner filter. A white-colored precipitate was recovered containing 17% by weight of oxide.

100 g of this precipitate were taken.

At the same time, an ammonium laurate gel was prepared under the following conditions: 250 g of lauric acid were introduced into 135 ml of aqueous ammonia (12 mol/l) and 500 ml of distilled water and this was then homogenized with the aid of a spatula.

20.3 g of this gel were added to 100 g of the precipitate and everything was then blended until a homogeneous paste was obtained.

The product obtained was then brought to 500° C. over 4 hours in stages.

It had the following surface properties after calcination at the temperatures and for the durations indicated:
4 h 900° C.=32 $m^2/g$
10 h 1000° C.=15 $m^2/g$
10 h 1200° C.=1.5 $m^2/g$.

EXAMPLE 2

This example relates to the preparation of a composition of 90% zirconium, 5% neodymium and 5% yttrium, these proportions being expressed in weight percentages of the oxides $ZrO_2$, $Nd_2O_3$ and $Y_2O_3$.

750 ml of zirconium nitrate (120 g/l), 9.5 ml of a neodymium nitrate solution (524 g/l) and 13 ml of an yttrium nitrate solution (386 g/l) were introduced into a beaker fitted with a stirrer. This was then made up with distilled water so as to obtain 1 liter of a solution of these 3 nitrates.

194 ml of an ammonia solution was introduced into a round-bottomed reactor fitted with a stirrer and were then made up with distilled water so as to obtain a total volume of 1 liter.

The solution of nitrates was introduced in 1 hour into the reactor with continuous stirring.

The solution obtained was placed in a stainless steel autoclave fitted with a stirrer. The temperature of the medium was brought to 150° C. over 2 hours with stirring.

The suspension obtained in this way was then filtered through a Büchner filter. A white-colored precipitate was recovered containing 19.1% by weight of oxide.

100 g of this precipitate were taken.

At the same time, an ammonium laurate gel was prepared under the following conditions: 250 g of lauric acid were introduced into 135 ml of aqueous ammonia (12 mol/l) and 500 ml of distilled water and this was then homogenized with the aid of a spatula.

22.8 g of this gel were added to 100 g of the precipitate and everything was then blended until a homogeneous paste was obtained.

The product obtained was then brought to 700° C. over 4 hours in stages.

It had the following surface properties after calcination at the temperatures and for the durations indicated:
4 h 900° C.=52 $m^2/g$
10 h 1000° C.=32.8 $m^2/g$
10 h 1100° C.=14.7 $m^2/g$
10 h 1200° C.=3.2 $m^2/g$.

EXAMPLE 3

This example describes a catalytic test for a catalyst prepared from a composition according to the invention.

a) Preparation of the Catalyst

The catalyst with 0.1% by weight of the metallic rhodium element based on the total mass of catalyst was prepared by impregnating the product of example 1 obtained after 4 h calcination at 500° C. with rhodium nitrate by a wet method. The impregnated product was then subjected to slow evaporation and drying and finally calcination for 4 h at 500° C. in air.

The catalyst in powdered form was then aged for 6 hours at 1100° C. in an oxidizing/reducing mixture (alternate 5 minute flows of 1.8% CO and 10% $H_2O$ on the one hand and on the other hand 1.8% of $O_2$ and 10% $H_2O$). Aging was carried out in a quartz tube reactor through which the flow of gas passed.

b) Test Conditions

Flow rate of the gases: 30 l/h

Weight of catalyst: 20 mg (particle size fraction 100-200 microns) diluted with 150 mg SiC.

The composition of the gases is given in the table below.

| Component | Lean mixture richness: 0.979 % by volume | Rich mixture richness: 1.024 % by volume |
|---|---|---|
| $CO_2$ | 14.00 | 14.00 |
| $H_2O$ | 10.00 | 10.00 |
| CO | 0.40 | 1.40 |
| $O_2$ | 0.80 | 0.40 |
| $C_3H_6$ | 0.0375 | 0.0375 |
| $C_3H_8$ | 0.0125 | 0.0125 |
| NO | 0.095 | 0.095 |
| $N_2$ | Complement to 100 | Complement to 100 |

The following results were observed:

In a rich mixture, the initial operating temperature for 20% conversion of NO was 340° C. and that for $C_3H_6$ was 345° C. These were therefore low temperatures in both cases.

In a lean mixture, the initial operating temperature for 20% conversion of NO, for $C_3H_6$ and for CO were was 331° C., 330° C. and 300° C. respectively.

All these results show the efficiency at low temperatures (initial operating temperatures below 350° C.) of catalysts based on the compositions of the invention.

EXAMPLE 4

Comparative

In this example, a composition based on zirconium and cerium oxides of which the specific surface area had been stabilized by lanthanum and neodymium oxides was prepared. This composition corresponded to the formula $ZrO_2/CeO_2/La_2O_3/Nd_2O_3$ in the respective weight proportions of these oxides of 75/20/2.5/2.5.

The procedure was as in example 2, using, per 100 g of product, the following quantities:

268 ml of zirconium nitrate (C=280 g/l)

79 ml of cerium nitrate (at a concentration of 236.5 g/l of $Ce^{4+}$, 15.5 g/l of $Ce^{3+}$ and free acidity of 0.7N)

5.5 ml of lanthanum nitrate (C=454 g/l)

4.8 ml of neodymium nitrate (C=524 g/l).

The preparative procedure was identical to that described in example 2. However, the precipitate was not mixed with the surfactant but was directly calcined. The product obtained after calcination for 4 hours at 1000° C. had a specific surface area of 44 m²/g and after calcination for 4 hours at 1100° C. a specific surface area of 18 m²/g. A catalyst was prepared separately containing 0.1% by weight of the metallic rhodium element based on the total weight of the catalyst by impregnating the composition prepared in the manner that has just been described and obtained after 4 h of calcination at 500° C. with rhodium nitrate by a wet method.

This catalyst prepared in this way was subjected to the same aging at 1100° C. and to the same test as described above in example 3.

The table below gives the results relating to initial operating temperatures at 20% (Ta) for the products of examples 1 and 4.

| Catalyst | TaNO Lean mixture (° C.) | TaC$_3$H$_6$ Lean mixture (° C.) | TaNO Rich mixture (° C.) | TaC$_3$H$_6$ Rich mixture (° C.) |
|---|---|---|---|---|
| Example 4 | 385 | 400 | 405 | 430 |
| Example 1 | 331 | 330 | 340 | 345 |

The starting temperatures were clearly higher in the cast of the product of the comparative example.

EXAMPLE 5

This example relates to a composition with 90% zirconium, 5% yttrium and 5% lanthanum, these proportions being expressed as weight percentages of the oxides $ZrO_2$, $Y_2O_3$ and $La_2O_3$.

310 ml of zirconium nitrate (290 g/l), 23.8 ml of yttrium nitrate (210 g/l) and 11 ml of lanthanum nitrate (454 g/l) were introduced into a beaker fitted with a stirrer. This was then made up with distilled water so as to obtain 1 liter of a solution of nitrates.

197 ml of an ammonia solution (12 mol/l) were introduced into a reactor fitted with a stirrer and was then made up with distilled water so as so as to obtain a total volume of 1 liter.

The solution of nitrates was introduced in one hour into the reactor with continuous stirring.

The solution obtained was placed in a stainless steel autoclave fitted with a stirrer. The temperature of the medium was brought to 150° C. over 2 hours with stirring.

33 grams of lauric acid were added to the suspension obtained in this way. The suspension was kept stirred for 1 hour.

The suspension was then filtered. A white-colored precipitate was recovered.

The product obtained was then brought to 850° C. over 3 hours in stages.

It had the following surface properties after calcination at the temperatures and for the durations indicated:

4 h 900° C. 57 m²/g 4 h 1000° C.=48 m²/g 10 h 1000° C.=43 m²/g 4 h 1100° C.=26 m²/g 10 h 1200° C.=2.5 m²/g.

X-ray analysis showed that between 900° C. and 1000° C. the product was in the form of a single cubic phase. At 1100° C. a very slight splitting of two diffraction peaks (around 2θ=35° and 60° C. respectively) showed that the diagram obtained was attributable to a single tetragonal phase.

EXAMPLE 6

This example relates to a composition with 80% zirconium, 5% yttrium and 15% lanthanum, these proportions being expressed as weight percentages of the oxides $ZrO_2$, $Y_2O_3$ and $La_2O_3$.

276 ml of zirconium nitrate (290 g/l), 23.8 ml of yttrium nitrate (210 g/l) and 33 ml of lanthanum nitrate (454 g/l) were introduced into a beaker fitted with a stirrer. This was then made up with distilled water so as to obtain 1 liter of a solution of nitrates.

199.5 ml of an ammonia solution (12 mol/l) were introduced into a reactor fitted with a stirrer and were then made up with distilled water so as so as to obtain a total volume of 1 liter.

The solution of nitrates was introduced in one hour into the reactor with continuous stirring.

The solution obtained was placed in a stainless steel autoclave fitted with a stirrer. The temperature of the medium was brought to 150° C. over 2 hours with stirring.

45 grams of lauric acid were added to the suspension obtained in this way. The suspension was kept stirred for 1 hour.

The suspension was then filtered through a Büchner filter and the filtered precipitate was washed with water with the equivalent by volume of the filtration mother liquors. Finally, a white-colored precipitate was obtained.

The product obtained was then brought to 700° C. over 4 hours in stages.

It had the following surface properties after calcination at the temperatures and for the durations indicated:

4 h 900° C.=88 $m^2/g$
4 h 1000° C.=58 $m^2/g$
10 h 1000° C.=52 $m^2/g$
4 h 1100° C.=21 $m^2/g$
10 h 1200° C.=2.5 $m^2/g$.

X-ray analysis showed that up to 900° C. the product was in the form of a single cubic phase. At 1000° C. the cubic phase developed towards the tetragonal phase while a minor phase appeared identifiable as $La_2Zr_2O_7$.

The product had a total pore volume of 1.61 ml/g of which 61% was provided by pores with a diameter of between 5 nm and 500 nm.

FIG. 1 is a porogram of the product. The diameter of the pores in Å is shown as abscissae, that is to say 1e+02 corresponds to a value of 10 nm, 1e+03 corresponds to a value of 100 nm etc. The pore volumes expressed in mL/g are shown as ordinates. Two populations of mesopores will be clearly seen on the porogram of which the diameters are centered around 60 nm and 12 nm.

The invention claimed is:

1. A composition consisting of zirconium oxide and yttrium oxide and having pores within the range of 5 nm to 500 nm, the composition having a specific surface area of at least 14 $m^2/g$ after calcination at 1000° C. for 10 hours, wherein the pores within the range of 5 nm to 500 nm provide at least 40% of the total pore volume, and wherein the composition comprises 2 mesopore populations.

2. The composition as claimed in claim 1, wherein the composition is in a single phase where the yttrium oxide is incorporated into the crystal lattice of zirconium oxide forming a solid solution.

3. A catalyst system comprising the composition of claim 1 and a transition metal, wherein the composition of claim 1 is a support for said transition metal.

4. The composition as claimed in claim 1, wherein the pores within the range of 5 nm to 500 nm are pores within the range of 10 nm to 200 nm.

5. A catalyst system, comprising a composition as defined in claim 1 and at least one of a support or a transition metal.

6. The catalyst system as claimed in claim 5, further comprising a catalytic material in combination with the composition.

7. A method for treating exhaust gases from internal combustion engines, comprising the step of treating said gases over a catalyst system as defined in claim 5.

8. The composition as claimed in claim 1, wherein the yttrium oxide is present in a concentration of at most 50% by weight based on the weight of the composition.

9. The composition as claimed in claim 8 wherein the concentration of yttrium oxide is 10% to 40%.

10. The composition as claimed in claim 1, wherein the specific surface area of at least 25 $m^2/g$ after calcination at 900° C. for 4 hours.

11. A method for preparing a composition as defined in claim 1, comprising the following steps:
    a) forming a mixture comprising compounds of zirconium and yttrium;
    b) adding a basic compound to the mixture obtained in step a) to obtain a precipitate;
    c) heating the precipitate obtained in step b) in a liquid medium;
    d) adding to the precipitate obtained in step c), a compound selected from the group consisting of anionic surfactants, nonionic surfactants, polyethylene glycols, carboxylic acids, salts of carboxylic acids and carboxymethylated fatty alcohol ethoxylate surfactants; and
    e) calcinating the precipitate obtained in step d).

12. The method as claimed in claim 11, wherein the compounds of zirconium and yttrium are nitrates, acetates or chlorides compounds.

13. The method as claimed in claim 11, wherein the precipitate from step (c) is heated at a temperature of at least 100° C.

14. A composition consisting of zirconium oxide and yttrium oxide and having pores within a range of 5 nm to 500 nm, the composition having a specific surface area of at least 14 $m^2/g$ after calcination at 1000° C. for 10 hours and having a sulfate anion content, said sulfate anion content being at most 50 ppm, wherein the composition comprises 2 mesopore populations.

15. A composition consisting of zirconium oxide, yttrium oxide, and an oxide of praseodymium, lanthanum or neodymium, the composition having a specific surface of at least 30 $m^2/g$ after calcination at 1000° C. for 10 hours and having a sulfate anion content, said sulfate anion content being at most 50 ppm, wherein the composition comprises 2 mesopore populations.

16. A composition consisting of zirconium oxide, yttrium oxide, and an oxide of praseodymium or neodymium and having pores within the range of 5 nm to 500 nm, the composition having a specific surface area of at least 30 $m^2/g$ after calcination at 1000° C. for 10 hours, wherein the composition comprises 2 mesopore populations.

17. The composition as claimed in claim 16, having two populations of pores whose size is centered about 10 nm and 60 nm respectively.

18. The composition as claimed in claim 16, having a specific surface area of at least 40 $m^2/g$ after calcination at 1000° C. for 10 hours.

19. The composition as claimed in claim 16, wherein said pores within the range of 5 nm to 500 nm provide at least 40% of the total pore volume.

20. The composition as claimed in claim 16, wherein the composition is in a single phase where the yttrium oxide and the oxide of praseodymium or neodymium are incorporated into the crystal lattice of zirconium oxide forming a solid solution.

21. The composition as claimed in claim 16, wherein the total concentration of yttrium oxide and oxide of praseodymium or neodymium is between 5% and 40% by weight, based on the weight of the composition.

* * * * *